July 4, 1950     B. M. HYMAN     2,513,941
CORN HARVESTER
Filed April 17, 1944     2 Sheets-Sheet 1
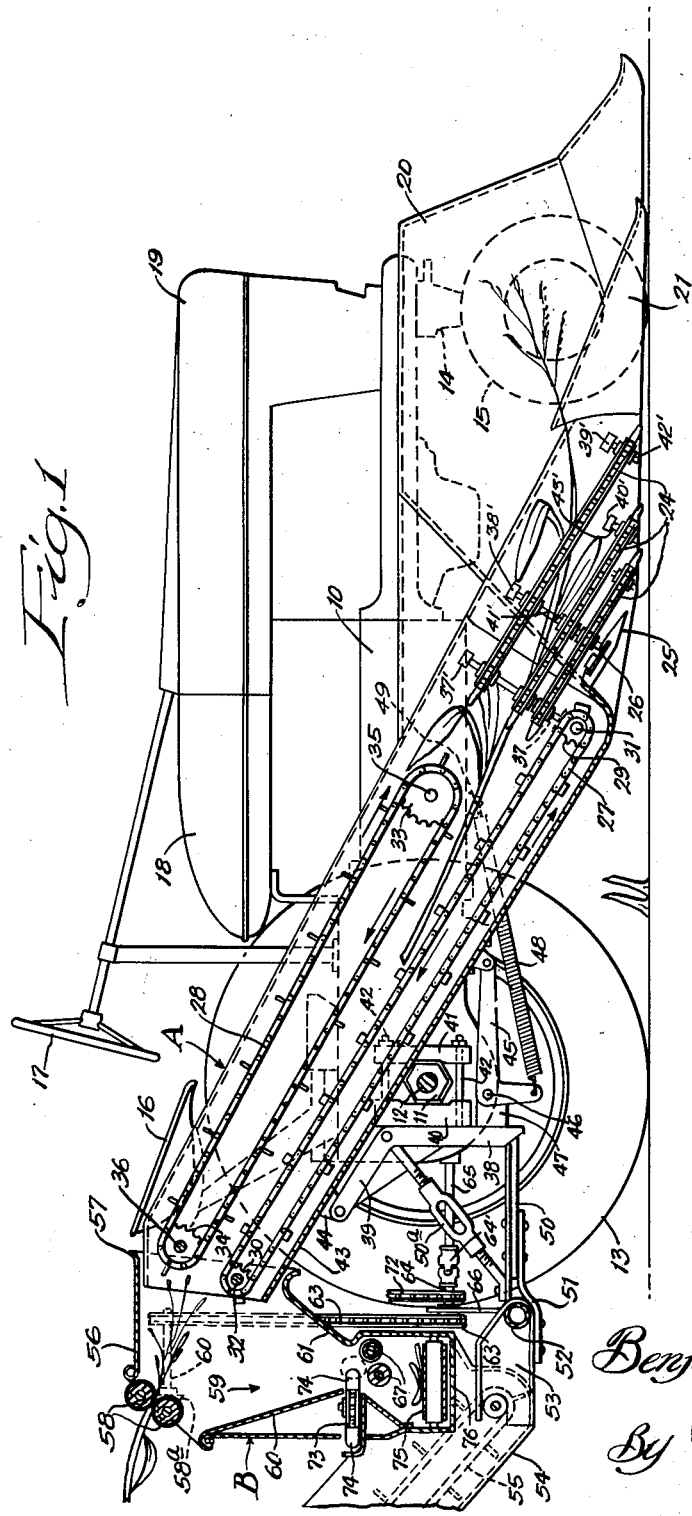
Inventor:
Benjamin M. Hyman,
By Paul O. Pippel
Attorney.

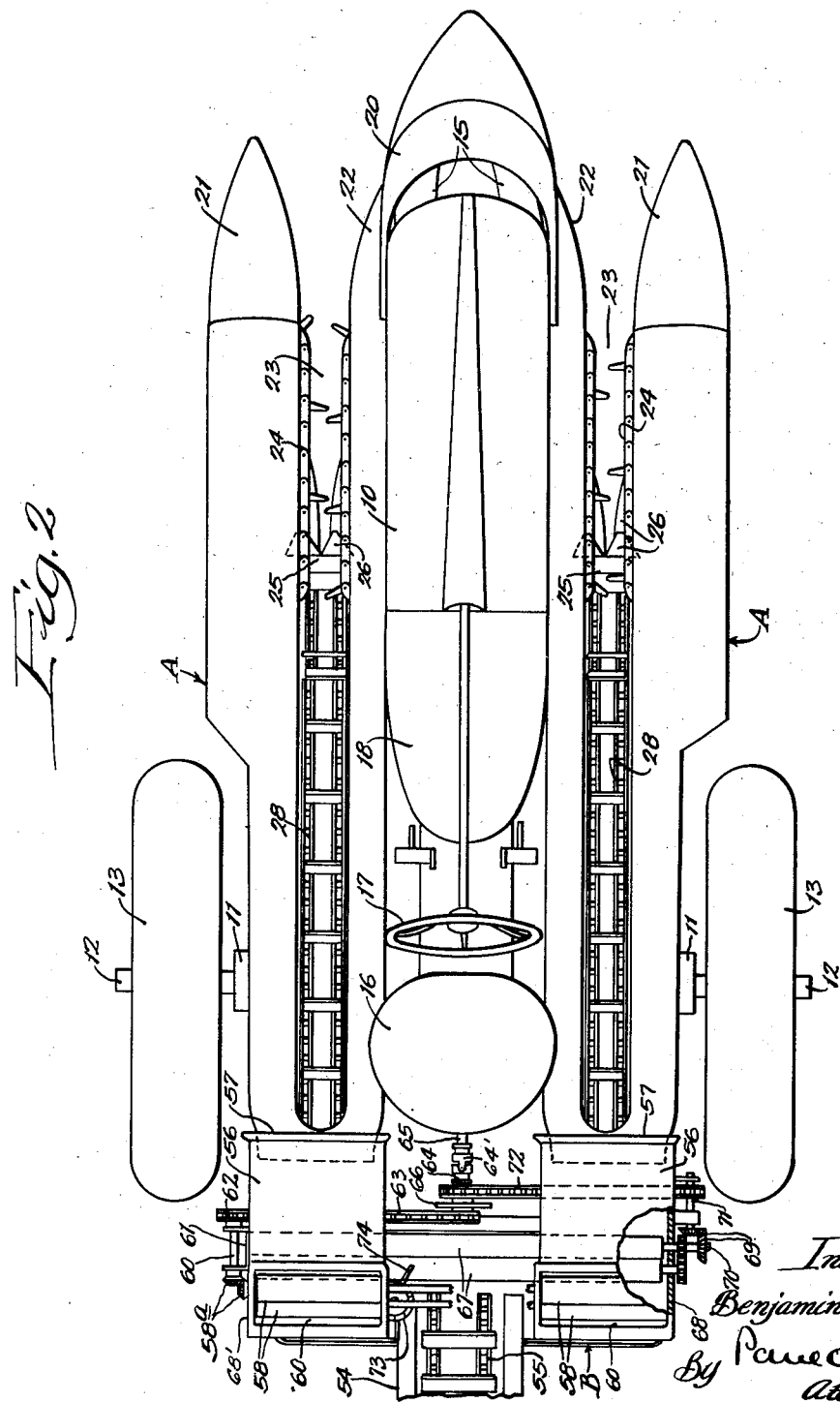

Patented July 4, 1950

2,513,941

UNITED STATES PATENT OFFICE 2,513,941

CORN HARVESTER

Benjamin M. Hyman, Moline, Ill., assignor to International Harvester Company, a corporation of New Jersey Application April 17, 1944, Serial No. 531,362

1 Claim. (Cl. 56—15)

This invention relates to corn harvesters and has special reference to a harvester of the class, wherein the stalks are cut and the ears removed therefrom in the field by a traveling motor-propelled machine. A method of harvesting corn in wide use at the present time is the snapping of ears in the field from the standing stalks by a traveling machine. The machine may either be drawn behind a tractor or mounted directly on the tractor. The stalks are passed between snapping rolls which remove the ears as the stalks are fed between the rolls. No practical means has been devised for collecting and saving the grain which is shelled from the ears during the snapping operation.

Another method of corn harvesting which has been proposed, but which has not come into use, is the cutting of the stalks with the subsequent removal of the ears therefrom. Patent 2,379,822, granted July 3, 1945, discloses and claims a side-mounted stalk-cutting type of corn harvester attached to a tractor.

The principal object of the present invention is to provide a tractor-mounted corn harvester of the stalk cutter type.

Another principal object is the arrangement of the component parts of a cutter type corn harvesting device on a tractor.

A further object is to provide stalk-severing means with conveying means for delivering severed stalks, butts first over the rear axle of a tricycle type of tractor.

Another object is the provision of a snapping means located rearwardly of the rear axle of a tractor to receive severed stalks, whereby the snapped ears are dropped downwardly at the rear of the rear axle.

Still another object is the provision of transverse husking means positioned forwardly of transverse snapping means at the rear of a rear axle structure.

The above objects and others which will appear from the disclosure are accomplished by a construction in which conveying means are mounted between the narrow body of a tractor and the traction wheels extending over the rear axle. Cutting means provided forwardly of the rear axle sever the stalks which are fed by the conveying means, butts first upwardly over the rear axle. Transverse snapping means spaced from the conveyor receive the stalks and snap the ears therefrom. Said ears then drop downwardly and are guided by suitable structure and are delivered to transverse husking means extending across the rear of the tractor rearwardly of the rear axle. A suitable forwarding means moves the ears over the husking means to the center of the tractor and suitable husking means carry the husks away which pass through the husking rolls away from the center of the tractor. Elevating means receive the husked ears and deliver them rearwardly where they may be received by a wagon pulled behind the tractor.

In the drawings:

Figure 1 is a side view of the outlines of a tractor with a corn harvester and its associated parts illustrated diagrammatically as carried by the tractor, certain portions being broken away in section to show the mechanism of the corn harvesting device; and Figure 2 is a plan view of the structure shown in Figure 1 with a portion broken away in section to show the husking rolls and the drive mechanism therefor.

The tractor illustrated is of the conventional general purpose type now in wide use and is of the tricycle type. A narrow body 10 is connected to a wide spread rear axle structure 11 from which the drive axles 12 project to carry traction wheels 13. The front of the tractor is supported by a steerable structure 14 on which a pair of closely spaced wheels 15 are mounted. Certain other parts of the tractor are shown, including an operator's seat 16, a steering wheel 17, a gasoline tank 18, and a radiator and hood structure 19.

It will be understood that the drawings are diagrammatic, and that the different units making up the harvesting device, the operative parts thereof and the driving mechanisms for the parts, are shown only sufficiently to give a general picture of the corn harvesting structure and its arrangement along with the positioning of the parts with relation to each other and with relation to the tractor. The harvesting device as illustrated consists essentially of three units: a harvester unit A, at each side of the tractor, includes stalk severing and conveying means which includes cutting and conveying; and, a unit B mounted at the rear of the tractor which includes snapping means, husking means, and supporting means for an ear delivering elevator. A shield 20 at the front of the tractor, which also serves as a divider for directing the fallen stalks into the throats of the harvesting units, may be considered as a fourth unit of the corn harvesting device.

Each of the harvesting units A has divider portions 21 and 22 which form a throat 23 through which the stalks of the rows of corn pass. It will be understood that the body of the tractor is sufficiently narrow to permit the location of the harvesting unit A at each side thereon in position for the rows of stalks at normal planting distance to pass through the throats 23. As the harvesting units are identical, only one will be described, it being understood that they are symmetrically arranged at each side of the tractor.

Gathering chains 24 at each side of the throat 23 feed the stalks rearwardly as they pass into the stalk-severing means 25, which are constructed as transversely reciprocating cutters having conventional knives 26. After the stalks are severed, the chains 24, of which there are three sets as shown in Figure 1, carry the stalks rearwardly until the butts are engaged by an upwardly and rearwardly extending conveyor 27. Said conveyor is moving at a faster rate of speed than the chains 24, whereby the stalks are tilted to a substantially horizontal position and the lower or butt ends of the stalks are carried upwardly under an upper conveyor 28 which is spaced above the conveyor 27. The conveyor 27 is mounted on drive sprockets 29 at the lower end and 30 at the upper end, said sprockets being carried respectively by transverse shafts 31 and 32 carried by the frame structure of the harvesting unit A. This frame has not been shown except for the outlines as it may be constructed in any suitable manner from sheet metal and angle bars, the only essentials being that it carry the operating parts of the device and support the conveyor, the conveyor chains, and the cutter mechanism. The upper conveyor 28 is carried by sprockets 33 at the lower end and sprockets 34 at the upper end, said sprockets being carried respectively by the drive shafts 35 and 36. Figure 1 indicates a vertically extending shaft 37 supported by a bearing member 37' by means of which power may be transmitted to the gathering chains 24. Additional bearing members 38', 39', and 40' are shown for supporting additional shafts 41', 42', and 43', respectively. It will be understood that any suitable drive mechanism may be provided for the conveyor chains and the cutting mechanism.

An attaching structure is illustrated in Figure 1 to indicate one means by which the corn harvester of this invention may be attached to a tractor. An attaching member 38 is formed with a vertical portion and an upwardly and rearwardly inclined portion 39, said portions being suitably braced to carry the load imposed thereon. The member 38 is connected by clamping means 40 and 41 and bolts 42 to the rear axle housing 11. The upper portion 43 of the harvesting unit A is pivotally secured by a bracket 44 to the upper end of the portion 39 of the attaching structure. This permits vertical movement of the lower portion of the harvesting unit with respect to the tractor. The bell crank member 45, pivoted at 46 on a bracket 47 extending forwardly from the member 38, provides means for partially balancing the harvesting unit A by means of a tension spring 48 connected to the downward extension of the bell crank 45 and to a forward point 49 on the tractor body 10. Each unit, by means of the construction above described, is pivotally mounted at its side of the tractor for following the ground contour.

To provide a supporting structure for the rear unit B, a draw-bar extension 50 from the member 38 is held in position by braces 50ª, only one of which is shown in the side elevation of Figure 1. The unit B is carried on this draw-bar structure by suitable means including an attaching member 51 extending rearwardly from the draw-bar structure 50. A hollow pipe 52 carries bracket structure 53 which supports an elevator 54. A conveyor 55 is illustrated in the elevator for delivering the husked ears of corn upwardly and rearwardly.

The rear unit B includes a housing 56 at each side of the tractor which has a flared open end portion 57 which slidably fits over the rear end of the upper portion 43 of the harvesting unit A at the corresponding side of the tractor. Substantially in alinement with the throat formed between the stalk-forwarding means conveyor 27 and 28, a pair of transverse snapping rolls 58 is rotatably mounted in suitable bearing structure on the housing 56. The stalks from the conveyors are fed between said rolls, the ears being snapped thereby and dropped downwardly through a chamber 59 formed by a rear wall 60 and a forward wall 61. As indicated in Figure 2, the snapping rolls may be driven by bevel gearing 58ª connecting one of the snapping rolls with a longitudinal shaft 60 mounted in a bearing bracket 61. A sprocket 62 on the shaft 60 is connected by a chain 63 with a sprocket on a stub shaft 64 which is connected by a universal joint 64' with the power take-off shaft 65 of the tractor. The stub shaft 64 is illustrated as being supported by an upwardly extending bracket 66 secured to the draw-bar structure 50.

The ears falling downwardly from the snapping rolls 58 between the walls 60 and 61 drop onto husking rolls 67. Said rolls, as illustrated, extend entirely across the rear of the unit B, being journaled within the end walls 68 and 68' thereof. As indicated in Figure 2, said rolls are geared together for operation in the same direction to remove the husks from the ears. Bevel gears 69 connect a shaft extension 70 from one roll with a longitudinal shaft 71 journaled on brackets secured to the end walls 68. A drive chain 72 extends from a suitable sprocket on the stub shaft 64 to a suitable sprocket on the shaft 71 for driving the husking rolls.

As the husking rolls are horizontal, ear-forwarding means are provided in the form of chains 73 having a plurality of ear-forwarding elements 74 thereon which pass over and along the central portion of the husking rolls. The chains are driven in a direction to move the ears from the ends of the husking rolls toward the center where they are discharged onto the elevating conveyor 55. A plurality of husked conveyors 75 located under each end of the husking rolls are adapted to carry the husks outwardly where they are discharged through openings in the outer end walls 68. Said conveyors also are arranged with their lower runs operating adjacent a bottom wall 76 whereby the loose kernels of corn are returned to the elevator.

The operation of the improved cutter type corn harvesting device of this invention has been described in connection with the description of the component parts thereof and their relationship with respect to each other and with respect to a tractor on which the device is mounted. An unusual efficient compact device is provided by mounting the cutting means forwardly of the tractor axle and elevating the stalks, butt first, rearwardly over the tractor axle as the snapping takes place at a point spaced rearwardly of the rear axle of the tractor. The ears may drop downwardly into the husking mechanism which is in the fore and aft direction between the snapping means and the rear axle of the structure. As substantially vertical space is required for husking and removing the husks, it is desirable to use the space behind the rear axle in order to have sufficient ground clearance for the machine. The elevation of the stalks above the rear axle provides this necessary vertical space for the proper design of an efficient husk-removing and shelled corn saving means. It is to be understood that the drawings are generally diagrammatic, and that details of the drive means for various parts have been illustrated only in such a manner as to indicate suitable driving means. Also the specific husking mechanism and the husk-removing structure has not been illustrated in detail as it forms a part of this structure only as to the general arrangement upon the tractor. The details of such a husker and husk-removing mechanism are disclosed and claimed in Patent 2,379,822, granted July 3, 1945. Applicant claims, however, all modifications in tractor-mounted cutter type corn harvesting devices falling within the scope of the appended claim.

What is claimed is:

A corn picker construction for tricycle tractors having a narrow longitudinal body, a transverse rear axle structure with wide spaced traction wheels and a narrow front rolling support, said construction comprising a harvesting structure extending along one side of the tractor laterally between the body and the wheel at that side of the tractor, said harvesting structure extending upwardly over the rear axle structure, means on said structure forwardly of the rear axle for severing standing stalks, means for tilting the upper ends of the severed stalks forwardly, means for delivering severed stalks from said cutter mechanism butts first upwardly and rearwardly over the rear axle structure, a snapping mechanism mounted on said frame structure spaced rearwardly from and above the rear axle structure to receive the severed stalks, husking mechanism mounted adjacent the rear axle structure below and forwardly of the snapping rolls to receive snapped ears gravitating downwardly between the snapping means and the rear axle, and means for conveying the snapped ears over said husking rolls.

BENJAMIN M. HYMAN.

REFERENCES CITED

The following references are of record in the file of this patent:

UNITED STATES PATENTS

| Number | Name | Date |
|---|---|---|
| 800,094 | Fleming | Sept. 19, 1905 |
| 1,616,283 | Shirey | Feb. 1, 1927 |
| 2,011,925 | Benjamin | Aug. 20, 1935 |
| 2,180,595 | Kuhlman | Nov. 21, 1939 |
| 2,196,025 | Paradise et al. | Apr. 2, 1940 |
| 2,344,305 | Hyman et al. | Mar. 14, 1944 |
| 2,427,861 | Johnson | Sept. 23, 1947 |